(12) United States Patent
Martinez-Spessot et al.

(10) Patent No.: US 12,047,357 B2
(45) Date of Patent: Jul. 23, 2024

(54) SECURE APPLICATION COMMUNICATIONS THROUGH SIDECARS

(71) Applicant: Intel Corporation, Santa Clara, CA (US)

(72) Inventors: Cesar Martinez-Spessot, Hillsboro, OR (US); Marcos Carranza, Portland, OR (US); Lakshmi Talluru, Chandler, AZ (US); Mateo Guzman, Beaverton, OR (US); Francesc Guim Bernat, Barcelona (ES); Karthik Kumar, Chandler, AZ (US); Rajesh Poornachandran, Portland, OR (US); Kshitij Arun Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 17/556,671

(22) Filed: Dec. 20, 2021

(65) Prior Publication Data

US 2023/0198959 A1 Jun. 22, 2023

(51) Int. Cl.
*H04L 9/40* (2022.01)
*G06F 9/54* (2006.01)

(52) U.S. Cl.
CPC .......... *H04L 63/0428* (2013.01); *G06F 9/547* (2013.01)

(58) Field of Classification Search
CPC ........ G06F 21/57; G06F 21/606; G06F 21/53; G06F 9/547; H04L 63/1425; H04L 63/0428; H04L 63/0227

(Continued)

(56) References Cited

U.S. PATENT DOCUMENTS 9,032,535 B2 * 5/2015 Lin ..................... H04N 9/8042
726/26
10,623,390 B1 4/2020 Rosenhouse
(Continued)

FOREIGN PATENT DOCUMENTS

CN 116319962 A 6/2023

OTHER PUBLICATIONS

Bachina, Bhargav, "Kubernetes—Learn Sidecar Container Pattern," Bachina Labs, Medium, Accessed at: https://medium.com/bb-tutorials-and-thoughts/kubernetes-learn-sidecar-container-pattern-6d8c21f873d, Sep. 6, 2020, 24 pages.
(Continued)

*Primary Examiner* — Amare F Tabor
(74) *Attorney, Agent, or Firm* — Jaffery Watson Mendonsa & Hamilton LLP

(57) ABSTRACT

Embodiments described herein are generally directed to a transparent and adaptable mechanism for performing secure application communications through sidecars. In an example, a set of security features is discovered by a first sidecar of a first microservice of multiple microservices of an application. The set of security features are associated with a device of multiple devices of a set of one or more host systems on which the first microservice is running. Information regarding the set of discovered security features is made available to the other microservices by the first sidecar by sharing the information with a discovery service accessible to all of the microservices. A configuration of a communication channel through which a message is to be transmitted from a second microservice to the first microservice is determined by a second sidecar of the second microservice by issuing a request to the discovery service regarding the first microservice.

20 Claims, 10 Drawing Sheets

(58) Field of Classification Search
USPC .......................................................... 713/151
See application file for complete search history.

(56) References Cited

U.S. PATENT DOCUMENTS

| | | | | |
|---|---|---|---|---|
| 10,827,020 | B1* | 11/2020 | Cao | H04L 67/561 |
| 10,951,717 | B2* | 3/2021 | Nainar | H04L 45/302 |
| 11,057,393 | B2* | 7/2021 | Coffing | G06Q 20/40 |
| 11,134,059 | B2* | 9/2021 | Barton | H04L 41/5054 |
| 11,233,826 | B2* | 1/2022 | Nakagoe | H04L 63/20 |
| 11,388,273 | B2* | 7/2022 | Bomma | H04L 67/306 |
| 11,509,732 | B2* | 11/2022 | Panikkar | H04L 67/51 |
| 11,570,271 | B2* | 1/2023 | Bahl | G06N 20/00 |
| 11,601,471 | B2* | 3/2023 | Mashargah | H04L 63/20 |
| 11,652,802 | B2* | 5/2023 | Veereshwara | H04L 63/0414 726/1 |
| 2020/0177549 | A1 | 6/2020 | Barton et al. | |
| 2021/0042160 | A1* | 2/2021 | Alamouti | G06N 5/022 |
| 2021/0328971 | A1 | 10/2021 | Bandi et al. | |
| 2023/0198959 | A1 | 6/2023 | Martinez-Spessot | |

OTHER PUBLICATIONS

Cachada, Armindo, "What is a Kubernetes Sidecar Container?," Splotch Smart Solutions, Accessed at: https://spltech.co.uk/what-is-a-kubernetes-sidecar-container/, Apr. 2, 2022, 7 pages.
Tozzi, Chris, "The Reasons to Use (or Not to Use) Sidecars in Kubernetes," SearchAppArchitecture.com, TechTarget, Accessed at: https://www.techtarget.com/searchapparchitecture/tip/The-reasons-to-use-or-not-use-sidecars-in-Kubernetes?vgnextfmt=print, May 28, 2021, 2 pages.
Extended European Search Report for EP22201894.7, Mar. 29, 2023, 7 pages.
Notification of EP Publication for EP22201894.8, May 24, 2023, 2 pages.

* cited by examiner

US 12,047,357 B2

SECURE APPLICATION COMMUNICATIONS THROUGH SIDECARS

TECHNICAL FIELD

Embodiments described herein generally relate to the field of application security and, more particularly, to the use of sidecars of microservices to discover security features supported by respective nodes and adapt to the discovered security features for communications among the microservices.

BACKGROUND

Microservice architecture takes advantage of the fact that applications are simpler to build and maintain when broken down into smaller pieces that work seamlessly together. In contrast to the more traditional monolithic application architectures, the microservice architecture is an architectural style that structures an application as a collection of smaller, more specialized parts that implement core business logic called services (or microservices), each of which communicate with one another across common interfaces (e.g., GraphQL, Representational State Transfer (REST) interfaces, and gRPC Remote Procedure Call (gRPC)). Microservices are increasingly being used in the development world as developers work to create larger, more complex applications that are better developed and managed as a combination of smaller services that work cohesively together for more extensive, application-wide functionality.

The sidecar design pattern allows developers to add a number of capabilities to applications by attaching sidecars to microservices to extend/enhance the functionality of respective microservices.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
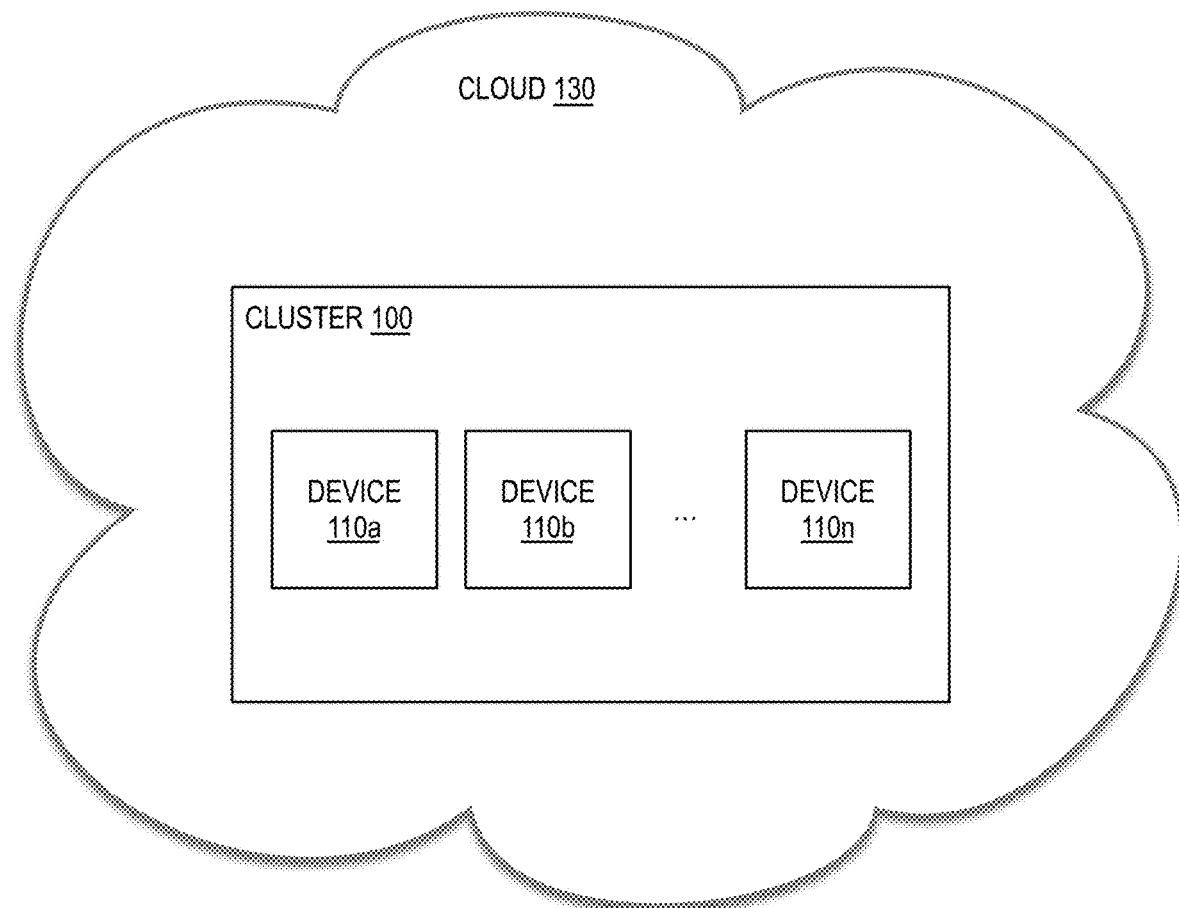
FIG. 1 is a block diagram illustrating a cluster in which various embodiments may be implemented.

Embodiments described herein are generally directed to a transparent and adaptable mechanism for performing secure application communications through sidecars. Keeping applications secure can be a time consuming task for independent software vendors (ISVs). For example, in order to protect communications among a collection of microservices that make up an application, developers should have knowledge about security features available on a particular hardware platform (e.g., a Central Processing Unit (CPU) or an XPU) as well as how to make use of the security features. Application security is made more complex as a result of the continuous evolution of libraries and potential vulnerabilities. Furthermore, different hardware platforms may support variety of different security features. As such, a heterogeneous type of environment increases the burden on developers as developers will need to identify and define the right mechanism to protect the communications among microservices taking into consideration the underlying hardware on which they might be running as well as software and/or firmware available on the underlying hardware.

Embodiments described herein seek to facilitate microservices development by abstracting within a sidecar design pattern the complexities relating to discovery of available security features of the hardware platforms on which the microservices are running and configuration and application of the security features to achieve secure communications among the microservices. In this manner, developers can focus their attention on the development of the core functionality and business logic of the application at issue and simply attach sidecars to their microservices to achieve desired application security. In one embodiment, a destination sidecar of a destination microservice of multiple microservices of an application discovers a set of one or more security features supported by a first device of multiple devices of a set of one or more computer systems on which the destination microservice is running. The information regarding the set of one or more security features is then made available to the other microservices by sharing, by the destination sidecar, the information with a discovery service that is accessible to all of the microservices. A configuration of a communication channel through which a message is to be transmitted from a source microservice to the destination microservice may then be determined by a source sidecar of the source microservice by issuing a request to the discovery service regarding the first microservice.

As described further below, in some embodiments, determination of the configuration of the communication channel may include dynamically increasing or reducing the strength of encryption for the communication channel based on the dynamic context of the communication channel. For example, when the peer endpoints are communicating over a shared memory channel within a secure host, the sidecars may use a different strength than if the endpoints are communicating between hosts.

There may be situations in which a desired level of security is not achievable based on the security features in common between the different hardware platforms on which the source and destination microservices are running. In such situations, alternative paths for communication of a message from the source microservice to the destination microservice may be considered in accordance with various embodiments. For example, there may not be an acceptable secure mechanism to communication directly from the source microservice to the destination microservice, but an intermediate device might be used to act as a mediator for the communication when an effect on Quality of Service (QoS) or latency of the communication is below a threshold.

Additional extensions may also include the performance of reputation management and/or anomaly detection to deprioritize and/or block traffic from microservices deemed potentially compromised. The potentially compromised microservices may further be isolated or physically co-located to enable secure and potentially compromised partitions in resource usage topologies.

While various embodiments described herein may be described with reference to specifically enumerated security features, the methodologies described herein are generally applicable to other existing security features and/or those that may be introduced in the future. Additionally, while various embodiments described herein may be described with reference to the use of a central discovery service to enable the sharing of information among all sidecars regarding security features available on their respective devices, it is to be appreciated decentralized approaches (e.g., use of a gossip protocol) may be used in alternative embodiments.

In the following description, numerous specific details are set forth in order to provide a thorough understanding of example embodiments. It will be apparent, however, to one skilled in the art that embodiments described herein may be practiced without some of these specific details.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein an "XPU" generally refers to an offload target (e.g., a hardware accelerator) commanded by a CPU. In a heterogeneous computing environment (e.g., one or more host systems having one or more integrated XPUs or one or more associated discrete XPUs), microservices may be concurrently executing on different types of hardware accelerators. Non-limiting examples of XPUs include Graphics Processing Units (GPUs), Field-Programmable Gate Arrays (FPGAs), Application-Specific Integrated Circuits (ASICs), Digital Signal Processors (DSPs), Tensor Processing Units (TPUs), Video Processing Units (VPUs), Image Processing Units (IPUs), Application Processing Units (APUs), Data Processing Units (DPUs), Network Processing Units (NPUs), and Smart Network Interface Cards (SmartNICs).

As used herein, the term "security features" generally refers to security functionality supported by and available for use on a given hardware platform. Non-limiting examples of security features include (i) a secure crypto-processor (e.g., a Trusted Platform Module (TPM) chip) within the hardware platform that may be used to secure the hardware through integrated cryptographic keys and (ii) hardware-based memory encryption or a trusted execution environment (e.g., Intel Software Guard Extensions (SGX)) operable to isolate application code and data in a memory of the hardware platform device. The given hardware platform may be deemed to support or have a particular security feature when all the building blocks (e.g., hardware, software, and/or firmware) that enable usage of the particular security feature are present, enabled, implemented, and/or installed as the case may be. For example, a particular version of TPM may be considered to be a security feature of a given hardware platform when (i) a TPM chip or firmware of the particular version is present and enabled, (ii) software implementing the programming interface (e.g., Public Key Cryptography Standards (PKCS) #11) to create and manipulate cryptographic tokens is installed, and (iii) TPM utility software of the particular version is installed.

As used herein, the terms "security feature discovery playbook" or simply "playbook" generally refer to a set of commands (e.g., queries and sub-queries) that may be executed on a hardware platform to discover whether a hardware platform has one or more security features. The playbook may be stored on a hardware platform or delivered to a sidecar of a microservice running on the hardware platform in the form of a file. Depending on the particular implementation, the file may be a binary file or may contain a human-readable structured data format (e.g., an eXtensible Markup Language (XML) file, a JavaScript Object Notation (JSON) file, a Comma-Separated Values (CSV) file, or a YAML Ain't Markup Language (YAML) file). As the availability of a particular security feature for use may depend on the existence of a number of hardware, software, and/or firmware building blocks, multiple queries and/or sub-queries may be used to confirm a hardware platform has the particular security feature. In some embodiments, the playbook may be represented in a form of a decision tree with additional sub-queries to be performed when the response to a base query is affirmative or negative.

As used herein a "message" generally refers to some form of communication intended to be made from one microservice (the source microservice) to another (the destination microservice). In embodiments described herein, sidecars attached to the microservices represent endpoints for message communication. A message from a source microservice to a destination microservice is communicated via a communication channel between a first sidecar attached to the source microservice and a second sidecar attached to the destination microservice. As such, the sidecars may be thought of as operating as proxies on behalf of their respective microservices. Non-limiting examples of a message include the source microservice making a synchronous or asynchronous call to an application programming interface (API) exposed by the destination microservice and the source microservice pushing a message to a message broker to which the destination microservice is subscribed.

Example Operating Environment

FIG. 1 is a block diagram illustrating a cluster 100 in which various embodiments may be implemented. In various examples described herein an application may run in the form of a collection of microservices distributed across multiple devices (e.g., devices 110a-n) of one or more host systems representing a heterogeneous computing environment. The devices may represent CPUs and/or XPUs of the same or different host systems and may be configured to be part of a cluster 100 (e.g., a Kubernetes cluster). Additionally, the devices may represent on-premise, hybrid, or public cloud infrastructure (e.g., cloud 130). A non-limiting example of a particular microservice-based infrastructure and the configuration of communication channels through which a collection of microservices may communicate is described further below with reference to FIG. 2.

Example Microservice Architecture

Figure 2:
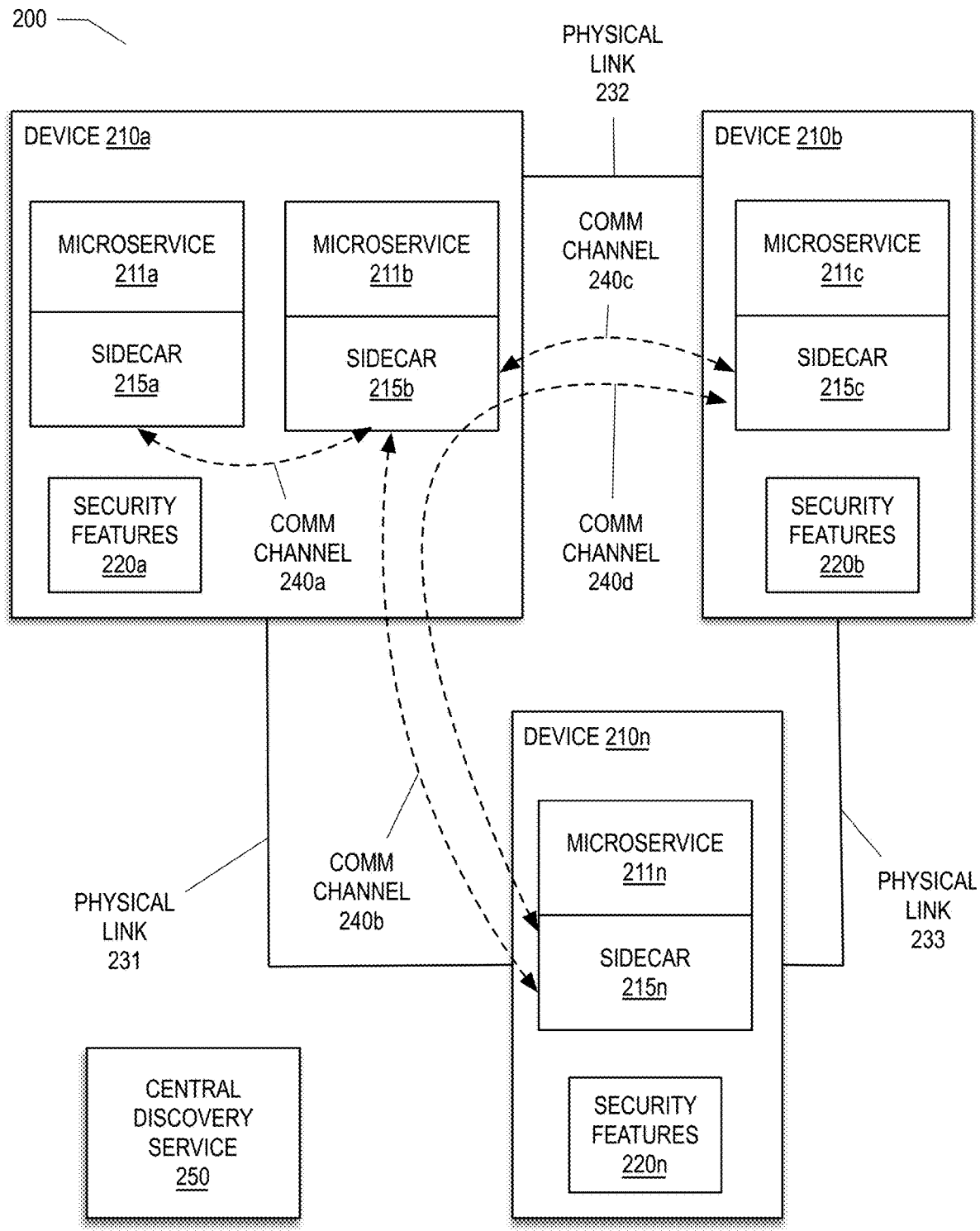
FIG. 2 is a more detailed block diagram illustrating communication among microservices running in a heterogeneous computing environment according to some embodiments.

FIG. 2 is a more detailed block diagram illustrating communication among microservices running in a heterogeneous computing environment 200 according to some embodiments. As those skilled in the art will appreciate, due to the range of security features that may be supported by different hardware platforms, securing communications among microservices in such a heterogeneous computing environment is a burdensome and complex task calling for in-depth knowledge of security features supported by the hardware platforms at issue and involving development effort outside the scope of the core business logic of the application at issue. As such, in various examples, the use of a sidecar design pattern is proposed to insulate developers and applications from such complexities by moving the performance of security feature discovery and appropriate dynamic configuration of communications channels among microservices to sidecars associated with the microservices. In this manner, developers need not concern themselves with the intricacies of performing security feature discovery and identifying commonality between security features available to peer endpoints and may instead focus their attention on the functionality of the application at issue.

In the context of the present example, the heterogeneous computing environment 200 is shown including devices 210a-n, which may correspond to devices 110a-n of FIG. 1. Each of devices 210a-n is shown running one or more microservices 211a-n and corresponding sidecars 215a-n. The sidecars 215a-n may represent a service mesh data plane through which all communications among the microservices 211a-n are exchanged. In one embodiment, a given sidecar may be associated with its respective microservice by injecting the sidecar into the same pod as the microservice and configuring the sidecar to operate as a forward and/or reverse proxy for specified traffic originated by and/or directed to the microservice, respectively. For example, it may be desirable to have the given sidecar intercept all outbound traffic from the corresponding microservice ensure all communications are protected. As described further below with reference to FIG. 3, each sidecar may implement a number of modules to facilitate, among other things, performance of security feature discovery and secure routing of messages between pairs of microservices.

Each device 210a-n is shown including a set of zero or more security features 220a-n that are available for use in connection with securing communications among microservices. As noted above, different hardware platforms may support different security features. As various examples herein focus on securing communications among microservices, the security features of interest generally relate to the ability to create and/or protect cryptographic keys that may be used to encrypt and decrypt messages exchanged among microservices. As such, it is to be appreciated, while various examples described herein may seek to discover the existence of an enumerated set of security features (e.g., a secure crypto-processor (e.g., a TPM chip) associated with a hardware platform as well as dependencies (e.g., PKCS #11 and TPM utility software) for making use of the secure crypto-processor and the availability of hardware-based memory encryption (e.g., Intel SGX) on the hardware platform), there may be additional security features that are supported by the hardware platform. It is also to be appreciated the set of enumerated security features sought to be discovered in the context of any particular example are merely exemplary and not intended to be limiting. As described further below with reference to FIGS. 3 and 4, respective security feature discovery playbooks may be executed by sidecars 215a-n to facilitate the discovery of security features available for use on the particular device on which they are running.

In one embodiment, a central discovery service 250 may be used to facilitate the understanding of security features of other microservices and to allow the other microservices to adapt to those security features. For example, the central discovery service 250, in addition to storing the addresses (e.g., universal resource identifiers (URIs)) of microservices 211a-n, may also serve as a repository in which discovered security features available to respective microservices are stored after completion of security feature discovery by their associated sidecars. In this manner, subsequently, when one sidecar would like to communicate with another on behalf of their respective microservices, both the address and the security features of the destination microservice may be obtained by querying the central discovery service.

In this example, the devices 210a-n are shown interconnected by physical links 231, 232, and 233. Depending on the nature of the particular devices and how they may be distributed among one or more host systems, there may be more or fewer physical links. Similarly, the physical links 231, 232, and 233 may represent system interconnects (e.g., a Compute Express Link (CXL)) among a CPU and XPUs or network interconnects (e.g., Ethernet) among devices of different host systems.

In some embodiments, the configuration by the source sidecar (e.g., sidecar 215a) of a communication channel (e.g., communication channel 240a) through which a pair of microservices (e.g., microservice 211a and microservice 211b) communicate may include dynamically increasing or reducing the strength of encryption for the communication channel based on the dynamic context of the communication channel. For example, if it is determined that the peer endpoints (e.g., sidecars 215a and sidecar 215n) are communicating over a shared memory channel within a secure host, the sidecars may use a different strength of encryption than if the endpoints (e.g., sidecar 215b and sidecar 215c) are communicating between hosts (e.g., via communication channel 240c) via a network interconnecting the devices (e.g., device 210a and device 210b).

Depending upon the topology of the devices and/or the commonality of security features supported, there may be situations in which a desired level of security for protecting communications exchanged between a given pair of microservices (e.g., microservices 211c and 211n) is not achievable by way of a direct communication channel (e.g., communication channels 240a-c) between respective sidecars (e.g., sidecars 215c and 215n). In such situations, an indirect communication channel (e.g., communication channel 240d) may be identified that makes use of an intermediate device (e.g., device 210a) as a mediator for the communication when an effect on Quality of Service (QoS) is within a predefined or configurable threshold.

Example Sidecar

Figure 3:
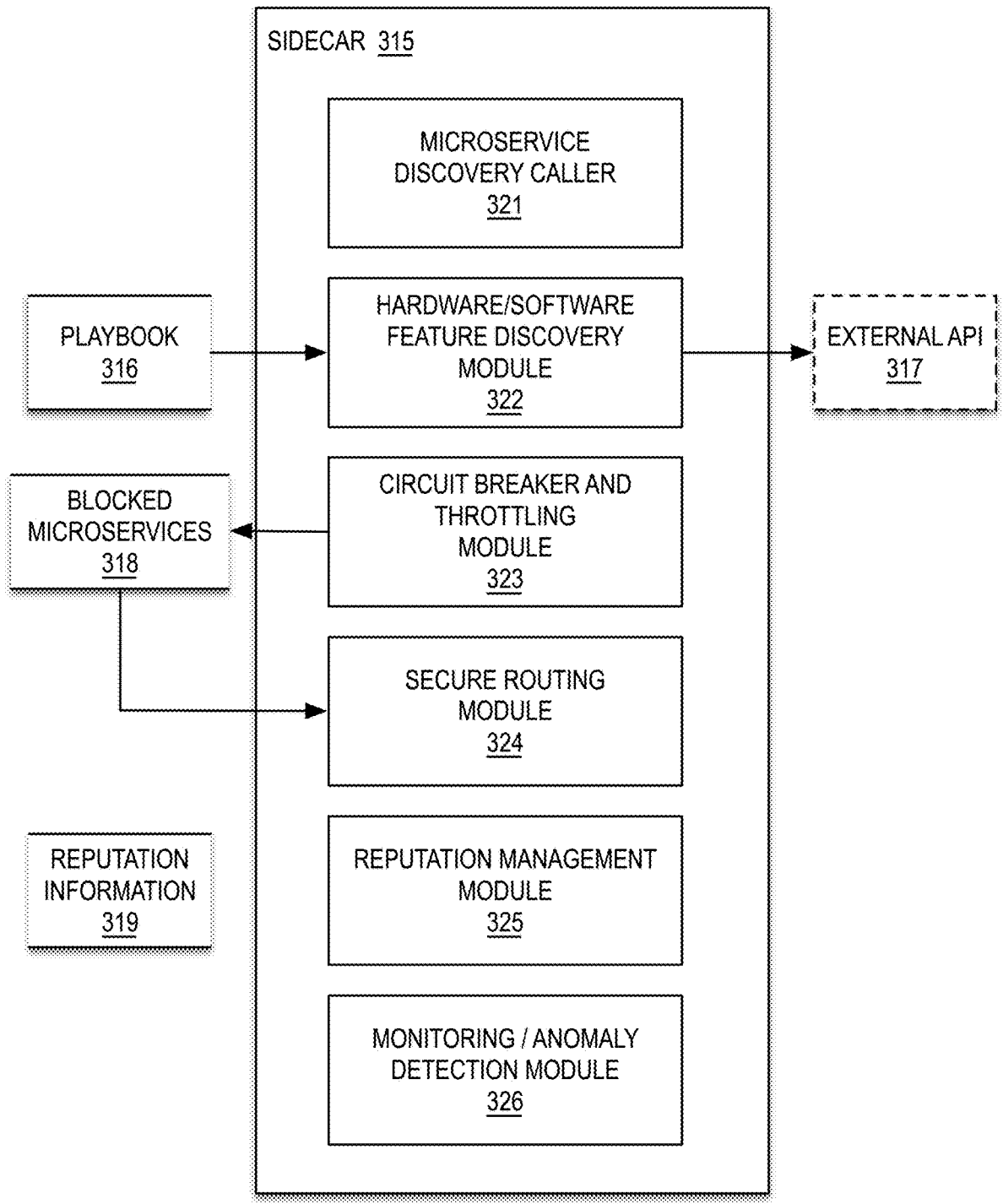
FIG. 3 is a block diagram of a sidecar according to some embodiments.

FIG. 3 is a block diagram of a sidecar 315 according to some embodiments. Sidecar 315 represents a non-limiting example of sidecars 215a-n. In the context of the present example, sidecar 315 includes a microservice discovery caller 321, a hardware (HW)/software (SW) feature discovery module 322, a circuit breaker and throttling module 323, a secure routing module 324, a reputation management module 325, and a monitoring/anomaly detection module 326. In an implementation that makes use of a central discovery service (e.g., central discovery service 250) as a mechanism through which security features are shared by microservices (e.g., microservices 211a-n), the microservice discovery caller 321 may be responsible for resolving addresses for microservices and obtaining information regarding security features for microservices. For example, the microservice discovery caller 321 may connect to the central discovery service to both an address of a destination microservice to which a message is to be sent on behalf of the source microservice associated with the sidecar 315 and the security features of the destination microservice by querying the central discovery service.

The HW/SW feature discovery module 322 may be responsible for executing a security feature discovery playbook (e.g., playbook 316) to discover security functionality supported by and available for use on the hardware platform (e.g., one of devices 210a-n) on which the sidecar 315 is running. In one embodiment, the playbook 316 may be provisioned statically during sidecar deployment. For example, the playbook 316 may be deployed on the hardware platform so as to be available to the sidecar 315 at runtime. Alternatively, the playbook 316 may be dynamically obtained and/or periodically updated through the use of an external service. For example, the HW/SW feature discovery module 322 may retrieve the playbook 316 at runtime via an external application programming interface (API) 317. A non-limiting example of security feature discovery processing that may be performed by the HW/SW feature discovery module 322 is described below with reference to FIG. 4.

In one embodiment, a given playbook (e.g., playbook 315) includes a set of commands (e.g., queries and sub-queries) to be executed on a particular type of hardware platform (e.g., a CPU, a GPU, a DSP, etc.) to discover whether the hardware platform has one or more security features of interest. For example, the security feature discovery process may involve running predefined queries to understand the availability of certain security capabilities (e.g., the presence and enablement of a TPM chip to perform various cryptographic key operations) and potentially running one or more sub-queries to identify the existence of dependencies (e.g., the availability of PKCS #11 and TPM utility software).

For purposes of illustration, assuming the playbook 315 is defined for discovery of security features of a CPU, depending upon the particular implementation and flow of the playbook 316, it may first call for identifying the stock-keeping unit (SKU) of the CPU at issue, for example, by checking a file (e.g., /proc/cpuinfo in a Linux operating system environment) containing information about the CPU. When the SKU is associated with a CPU type that supports Intel SGX, further sub-queries may be included in the playbook 316 for determining the availability of SW and firmware (FW) upon which Intel SGX is dependent. The playbook 315 may further include a query for reading a file (e.g., /dev/tpm0) to confirm availability of TPM 2.0. And, if so, the playbook 316 may further include a sub-query to identify existence of the PKCS #11 SW module as the interface with TPM.

The circuit breaker and throttling module 323 may be responsible for stopping execution of certain flows based on received events. For example, as described further below, the circuit breaker and throttling module 323 may maintain a list of blocked microservices 318 to which no further communications should be directed and/or from which no further communications should be permitted as a result of detection of a behavioral anomaly and/or a reputation threshold being exceeded.

The secure routing module 324 may be responsible for selecting an appropriate security mechanism for configuration of a communication channel between a destination microservice sidecar and the source microservice sidecar and performing the handshake with the destination microservice to facilitate transmission of a message from the source microservice to the destination microservice. In one embodiment, the secure routing module 324 may make use of information obtained by one or more other modules (e.g., the microservice discovery caller 321 and/or the circuit breaker and throttling module 323) of the sidecar 315. For example, the secure routing module 324 may be invoked by the microservice discovery caller 321 with information identifying the security features of the destination microservice to facilitate selection of appropriate security to be applied to the message. Additionally, the secure routing module 324 may drop messages intended for delivery to microservices on the list of blocked microservices 318. A non-limiting example of secure routing processing that may be performed by the secure routing module is described below with reference to FIG. 8.

The reputation management module 325 may be responsible for maintaining reputation information 319 indicative of the reputation of the microservices, for example, based on observation of security policy violations by the microservices. The reputation information 319 may include a reputation score for each of the microservices that is indicative of the microservice potentially being compromised when it exceeds a particular threshold. A non-limiting example of reputation management processing that may be performed by the reputation management module is described below with reference to FIG. 7.

The monitoring/anomaly detection module 326 may be responsible for monitoring and identification of behavioral anomalies, for example, with respect to historical norms. According to one embodiment, the monitoring/anomaly detection module 326 may be invoked in-line during the processing of each message exchange between a source microservice and a destination microservice. The monitoring/anomaly detection module 326 may track the number of calls from every microservice to every other microservice and calculate one or more statistical metrics (e.g., maximum, minimum, average, mean, median, and mode) relating thereto over the course of one or more predefined or configurable periods of time (e.g., minutes, hours, days, etc.). In this manner, the monitoring/anomaly detection module 326 may compare historical statistical metrics to currently observed statistical metrics to detect the existence of a behavioral anomaly potentially indicative of a microservice being compromised. A non-limiting example of monitoring and identification of behavioral anomalies that may be performed by the monitoring/anomaly detection module 326 is described below with reference to FIG. 6.

The various modules of the sidecar 315, the micro services 211*a-n* of FIG. 2 and the processing described below with reference to the flow diagrams of FIGS. 4-8 may be implemented in the form of executable instructions stored on a machine readable medium and executed by a processing resource (e.g., a microcontroller, a microprocessor, a CPU core, an ASIC, an FPGA, or the like) and/or in the form of other types of electronic circuitry. For example, the processing may be performed by one or more virtual or physical computer systems of various forms, such as the computer system described below with reference to FIG. 9.

Security Feature Discovery

Figure 4:
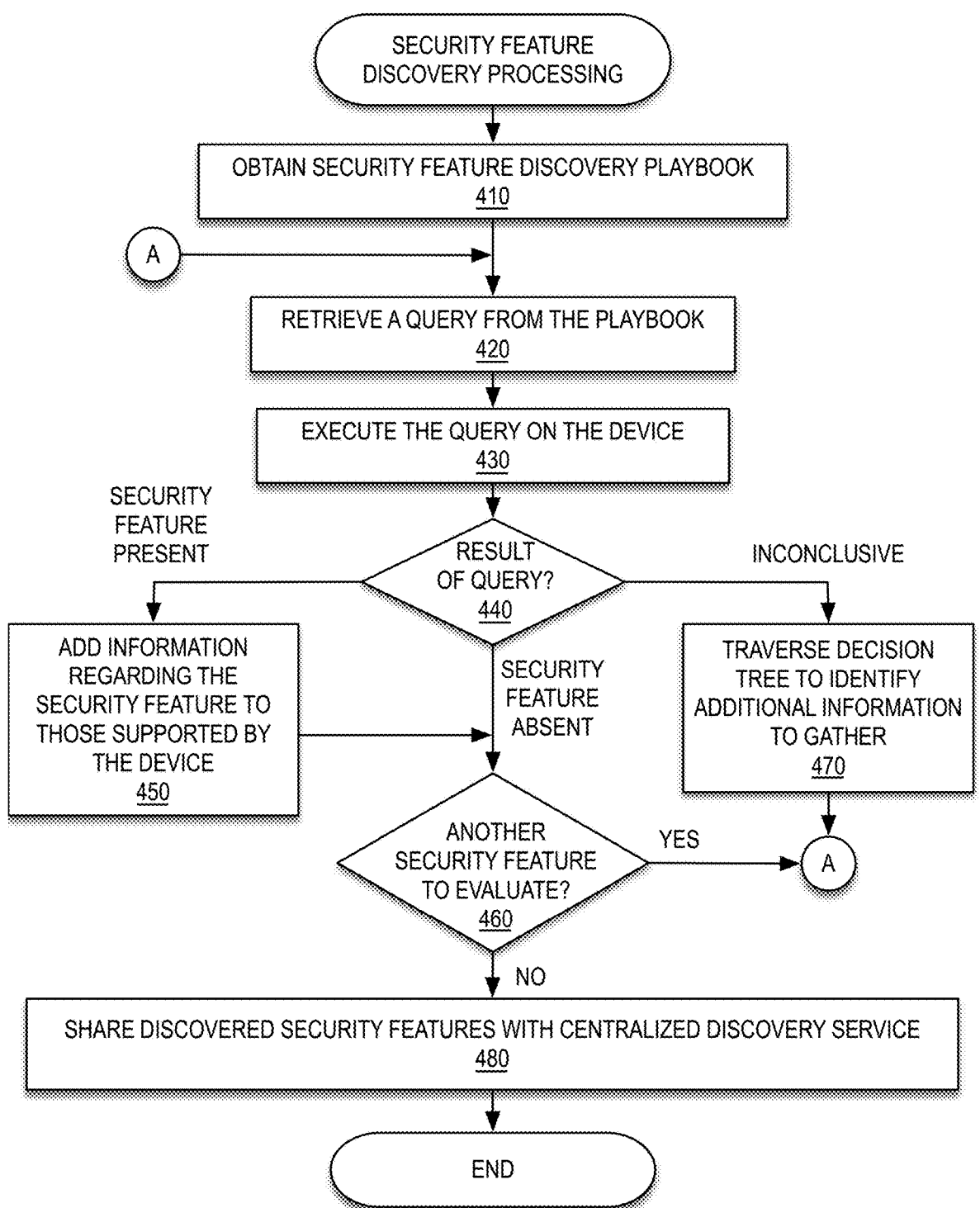
FIG. 4 is a flow diagram illustrating operations for performing security feature discovery processing according to some embodiments.

FIG. 4 is a flow diagram illustrating operations for performing security feature discovery processing according to some embodiments. In the context of the present example, it is assumed an application is running in the form of a collection of microservices (e.g., microservices 211*a-n*) distributed among multiple devices (e.g., devices 210*a-n*) of a heterogeneous computing environment (e.g., heterogeneous computing environment 200). Additionally, it is assumed respective sidecars (e.g., sidecars 215*a-n*) have been associated with each microservice of the collection of microservices. While in the context of the present example, performance of security feature discovery is described with reference to a particular sidecar of the respective sidecars, it is to be appreciated each of the respective sidecars may perform security feature discovery processing, for example, at part of startup or initialization processing.

At block 410, a security feature discovery playbook (e.g., playbook 316) is obtained by the sidecar. For example, a HW/SW feature discovery module (e.g., HW/SW feature discovery module 322) of the sidecar may load a security feature discovery playbook from a predetermined location that was stored on the hardware platform (e.g., one of devices 210*a-n*) prior to or during sidecar deployment. Alternatively, the HW/SW feature discovery module may retrieve a security feature discovery playbook appropriate for the particular hardware platform from an external service via an external API (e.g., external API 317). Responsive to obtaining the security feature discovery playbook, the HW/SW feature discovery module may commence execution of the security feature discovery playbook starting with block 420.

At block 420, a query is retrieved from the security feature discovery playbook. For example, the retrieved query may represent an initial query of a set of queries to determine the availability of a particular security feature (e.g., TPM or Intel SGX) on the hardware platform.

At block 430, the query is executed on the hardware platform. For example, the query may represent reading a particular file (e.g., /proc/cpuinfo) that contains information about the hardware platform or checking for availability of another file (e.g., /dev/tpm0) to confirm availability of TPM 2.0 on the hardware platform.

At block 440, the result of the query is evaluated. If the result indicates the security feature is present, then processing continues with block 450. If the result indicates the security feature is absent, then processing continues with decision block 460. Otherwise, if the result is inconclusive, processing continues with block 470.

At block 450, information regarding the security feature confirmed to be available at decision block 440 is added to a list of those security features supported by the hardware platform and processing continues with decision block 460.

At block 470, a decision tree represented within the security feature discovery playbook is traversed to identify additional information to gather to confirm the presence or absence of the security feature at issue. For example, the execution of one or more additional sub-queries may be helpful in connection with determining the availability of the security feature at issue. After identifying the next query or sub-query to be executed, processing loops back to block 420 to continue execution of the security feature discovery playbook.

At decision block 460, it has just been confirmed that a particular security feature is present or absent; therefore, it is determined whether there is another security feature to evaluate. If the security feature discovery playbook includes an additional query and/or sub-queries relating to another security feature, then processing loops back to block 420 to continue processing the security feature discovery playbook; otherwise, processing continues with block 480.

At block 480, the discovered security features (e.g., those logged at block 440) are shared with a centralized discovery service (e.g., centralized discovery service 250). A local copy may also be stored by the sidecar to facilitate identification of appropriate security measures to protect a communication channel with a destination microservice as described further below in connection with FIG. 8.

Message Delivery

Figure 5:
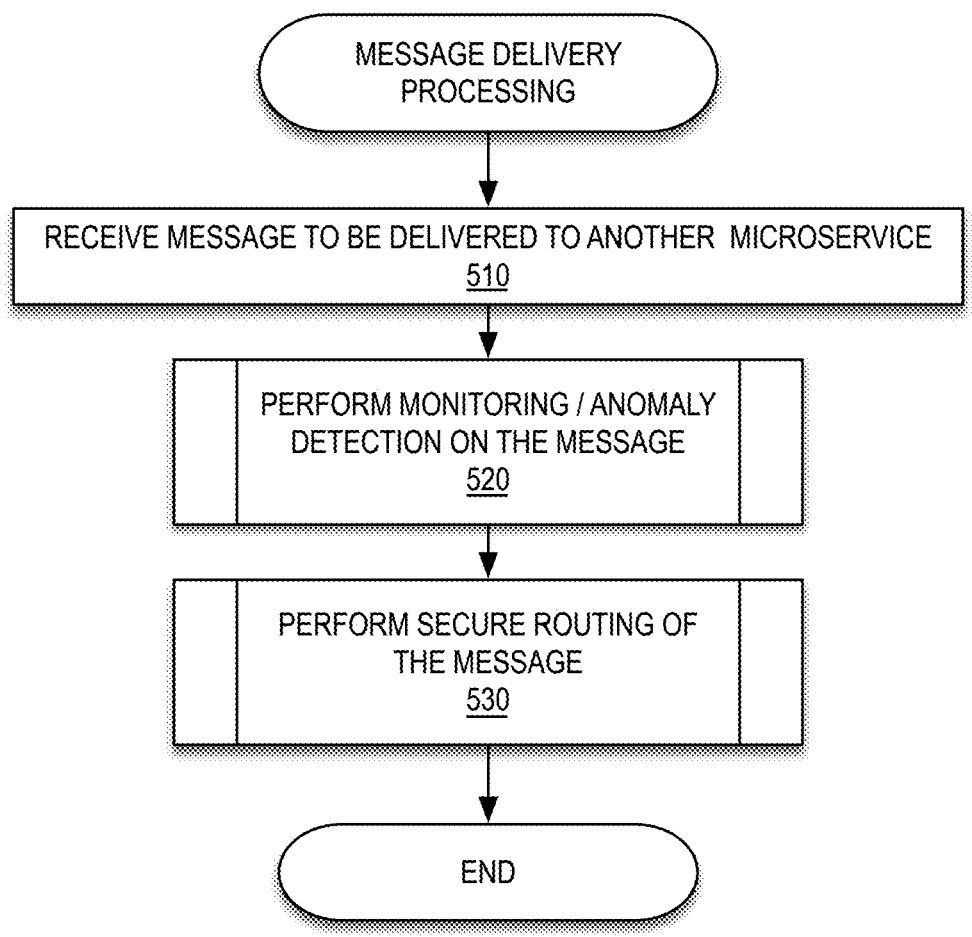
FIG. 5 is a flow diagram illustrating operations for performing message delivery processing according to some embodiments.

FIG. 5 is a flow diagram illustrating operations for performing message delivery processing according to some embodiments. In the context of the present example, it is assumed the sidecars (e.g., sidecars 215*a-n*) have completed their respective startup/initialization processing and some form of security feature discovery processing (e.g., the security feature discovery processing described above with reference to FIG. 4) has also been completed.

At block 510, a message to be delivered to a destination microservice is received by a sidecar associated with the source microservice. As noted above, the message may represent a synchronous or asynchronous call by the source microservice to an API exposed by the destination microservice or message-passing via a message broker.

At block 520, monitoring/anomaly detection may be performed on the message. According to one embodiment monitoring/anomaly detection may be performed by the sidecar attached to the source microservice. In alternative embodiments, the monitoring/anomaly detection may be performed by the sidecar attached to the destination microservice. An example of monitoring/anomaly detection processing is described below with reference to FIG. 6.

At block 530, secure routing of the message is performed by the sidecar attached to the source microservice. In one embodiment, secure routing includes identifying the greatest common security feature between the source and destination microservices, making use of the identified security feature to configure a communication channel between the source and destination microservices, and transmitting the message from the source microservice to the destination microservice via the communication channel with the attached sidecars acting as proxies on behalf of their respective microservices. An example of secure routing processing is described below with reference to FIG. 8.

Monitoring/Anomaly Detection

Figure 6:
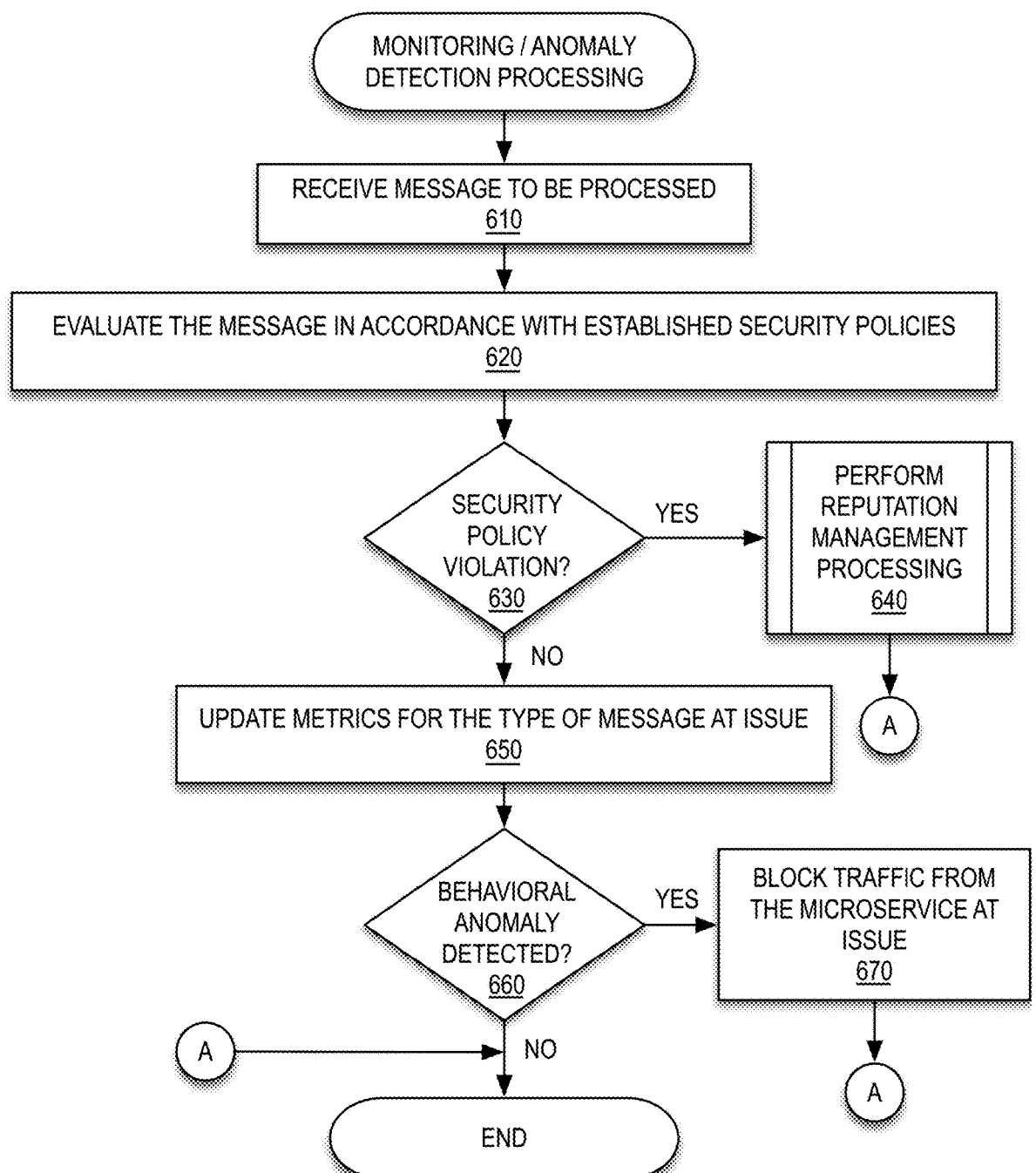
FIG. 6 is a flow diagram illustrating operations for performing monitoring/anomaly detection processing according to some embodiments.

FIG. 6 is a flow diagram illustrating operations for performing monitoring/anomaly detection processing according to some embodiments. In the context of the present example, it is assumed message delivery processing has been initiated as a result of a source microservice attempting to send a message to a destination microservice. Depending upon the particular implementation, the monitoring/anomaly detection processing may be performed by a sidecar (e.g., one of sidecars 215a-n) attached to a respective microservice (e.g., one of microservices 211a-n) representing the source microservice or by a sidecar attached to a respective microservice representing the destination microservice.

At block 610, the message to be processed is received by the sidecar.

At block 620, the message may be evaluated in accordance with a set of established security policies. The security policies may define various conditions that are representative of a security problem. For example, the security policies may flag a message having an incorrect signatures (e.g., potentially indicative of a change having been made to the message after the signature was generated).

At decision block 630, it is determined whether evaluation of the message based on the security policies indicated the existence of a security policy violation. If so, processing branches to block 640; otherwise, processing continues with block 650.

At block 640, reputation management processing may be performed. For example, as a result of a security policy violation by the source microservice, the sidecar may report the security policy violation to a reputation management module (e.g., reputation management module 325) to allow the reputation score for the source microservice to be updated accordingly based on the severity of the security policy violation. An example of reputation management processing is described further below with reference to FIG. 7.

At block 650, metrics for the type of message at issue are updated. For example, as described above, a monitoring/anomaly detection module (e.g., monitoring/anomaly detection module 326) may track the number of calls from every microservice to every other microservice and calculate one or more statistical metrics relating thereto over the course of one or more predefined or configurable periods of time. Depending upon the particular implementation, the tracking may be performed regardless of the type of message at issue (e.g., asynchronous call, synchronous call, or posting of a message to a message broker) or for finer granularity may be performed separately based on the type of message at issue.

At decision block 660, it is determined whether the current metrics for a particular time period (e.g., expressed in minutes, hours, or days) deviate by more than a predefined or configurable threshold from corresponding historical statistical metrics (e.g., by day of week, time of day, etc.). If so, then processing branches to block 670; otherwise, monitoring/anomaly detection processing is complete. According to one embodiment, if a particular microservice historically calls another microservice X times within a particular time interval and current observations indicate such calls are now being made at a significantly higher rate of Y times during the particular time interval, then it may be assumed something wrong may be happening and a behavioral anomaly may be identified and/or a warning or alert may be issued to an administrative user.

At block 670, the sidecar may cause traffic to be blocked to or from the source microservice. For example, the sidecar may inform a circuit breaker and throttling module (e.g., circuit breaker and throttling module 323) to place the source microservice on a list of blocked microservices (e.g., blocked microservices 318).

Reputation Management

Figure 7:
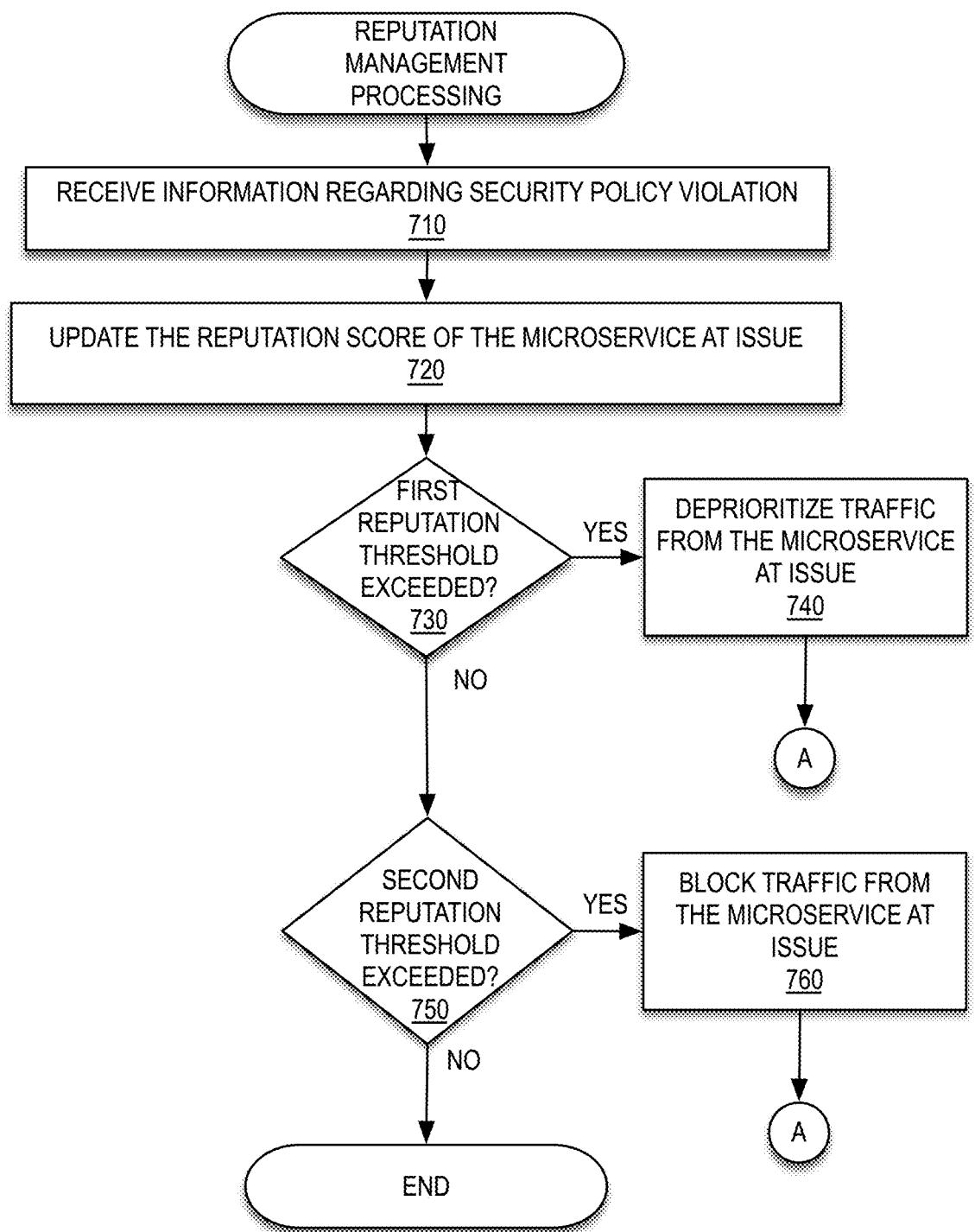
FIG. 7 is a flow diagram illustrating operations for performing reputation management processing according to some embodiments.

FIG. 7 is a flow diagram illustrating operations for performing reputation management processing according to some embodiments. The reputation management processing may be performed by a reputation management module (e.g., reputation management module 325) of a sidecar (e.g., one of sidecars 215a-n), for example, in response to detection of a security policy violation by either a source or destination microservice (e.g., one of microservices 211a-n).

At block 710, information regarding a security policy violation is received by the sidecar. The information may include identification of the security policy at issue and the microservice at issue.

At block 720, the reputation score of the microservice at issue is updated to reflect the increased security risk represented by the microservice at issue. For example, the score may be updated within a datastore containing reputation information (e.g., reputation information 319) maintained by the reputation management module based on the relative severity of the security policy violation.

At decision block 730, it is determined whether the update results in the microservice at issue exceeding a first reputation threshold. If so, processing branches to block 740; otherwise, processing continues with decision block 750. In the context of the present example, the first reputation threshold may represent a score beyond which traffic to/from the microservice at issue will be deprioritized with respect to traffic to/from other microservices.

At block 740, the sidecar may cause traffic to and/or from the microservice at issue to be deprioritized relative to the other microservices. For example, the sidecar may inform a circuit breaker and throttling module (e.g., circuit breaker and throttling module 323) to place the microservice at issue on a list of deprioritized microservices. This may allow, for example, messages directed to or originated from the microservice at issue to receive lower priority treatment by a message broker.

At decision block 750, it is determined whether the update results in the microservice at issue exceeding a second reputation threshold (e.g., higher than the first reputation threshold). If so, processing branches to block 760; otherwise, reputation management processing is complete. In the context of the present example, the second reputation threshold may represent a score beyond which traffic to/from the microservice at issue will be blocked.

At block 760, the sidecar may cause traffic to be blocked to and/or from the microservice at issue. For example, the sidecar may inform the circuit breaker and throttling module to place the microservice at issue on a list of blocked microservices (e.g., blocked microservices 318).

While in the context of the present example, two reputation thresholds are implemented, more or fewer reputation thresholds may be used to achieve the desired level of control over potentially compromised microservices.

Secure Routing

Figure 8:
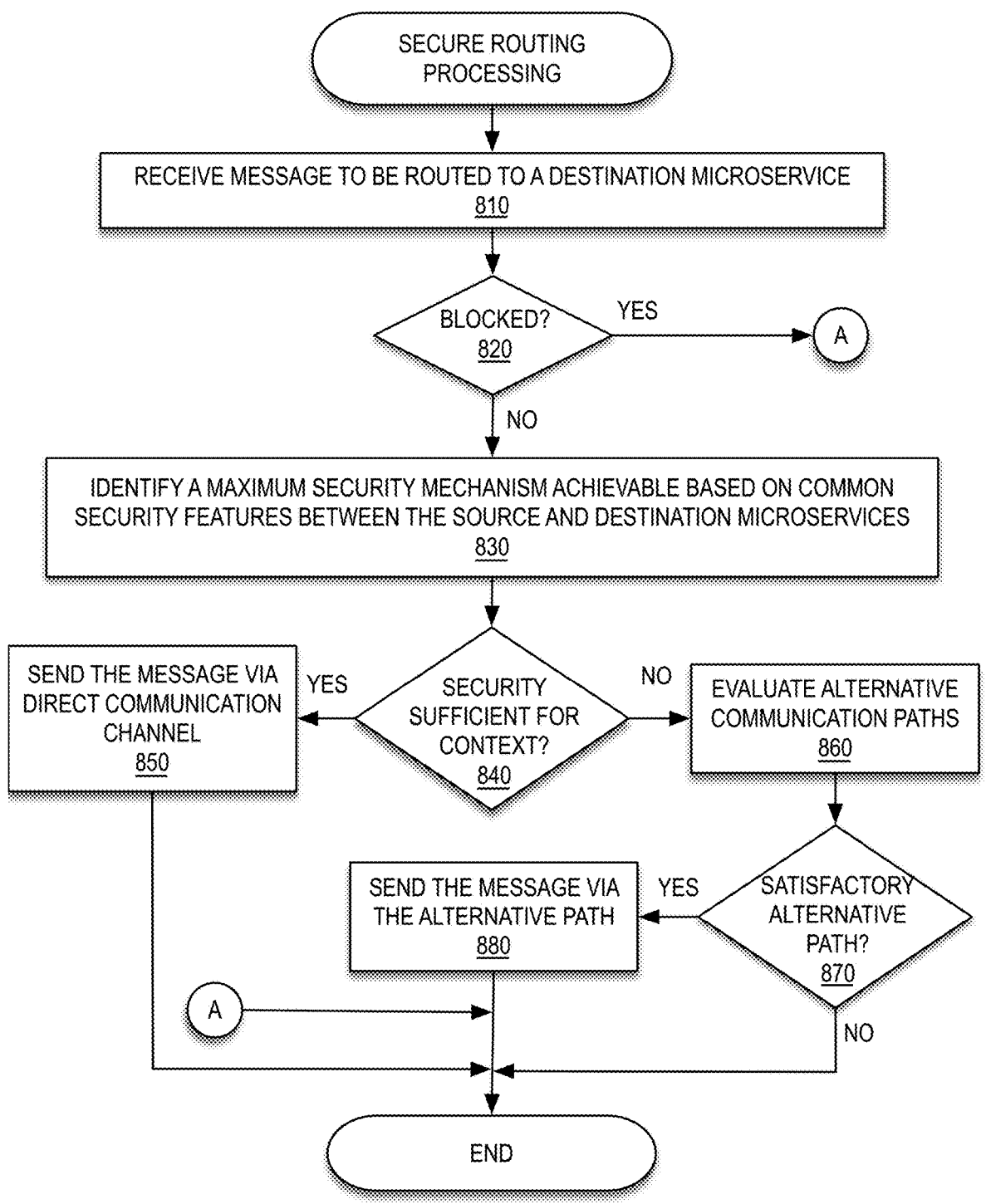
FIG. 8 is a flow diagram illustrating operations for performing secure routing processing according to some embodiments.

FIG. 8 is a flow diagram illustrating operations for performing secure routing processing according to some embodiments. In the context of the present example, it is assumed message delivery processing has been initiated as a result of a source microservice attempting to send a message to a destination microservice. Furthermore, it is assumed any desired monitoring/anomaly detection and/or reputation management (e.g., as described with reference to FIGS. 6 and 7, respectively) has been performed. The secure routing processing may be performed by a secure routing module (e.g., secure routing module 324) of a sidecar (e.g., one of sidecars 215a-n) attached to the source microservice (e.g., one of microservices 211a-n).

At block 810, a message to be routed to a destination microservice (e.g., one of microservices 211a-n) is received by the sidecar. For example, the source microservice may make an asynchronous or synchronous call to an API exposed by the destination microservice or the source microservice may make a call tan API exposed by a message broker to post a message for the destination microservice.

At decision block 820, it is determined whether traffic to the destination microservice is blocked. If so, processing branches to the end and secure routing processing is complete; otherwise, processing continues with block 830. In one embodiment this determination involves the sidecar may check a list of blocked microservices (e.g., blocked microservices 318) maintained by a circuit breaker and throttling module (e.g., circuit breaker and throttling module 323).

At block 830, a maximum security mechanism achievable based on common security features between the source and destination microservices is identified. According to one embodiment, the secure routing module first obtains the address of the destination microservice and its security features. For example, the secure routing module may invoke a microservice discovery caller (e.g., microservice discovery caller 321) with information regarding the destination microservice. Then, based on the security features common to both the source and destination microservices, the maximum security mechanism achievable may be identified based on a prioritized list of security mechanisms.

At decision block 840, it is determined whether the security mechanism identified at block 830 is sufficient for the context of the communication. If so, processing continues with block 850; otherwise processing branches to block 860. According to one embodiment, if the peer endpoints (e.g., the sidecars attached to the source microservice and the sidecar attached to the destination microservice) are communicating over a shared memory channel within a secure host system, it may be permissible to use relatively lower strength of encryption. Whereas, if the endpoints are communicating between host systems via a potentially insecure network interconnecting the hardware platforms on which the source and destination microservices are running a relatively higher strength of encryption may be desired.

At block 850, the message is sent via a direct communication channel. For example, message is sent via a communication channel between the sidecar attached to the source microservice and the sidecar attached to the destination microservice that includes no intermediate sidecars. Prior to sending the message, the source microservice may establish an encrypted connection via the communication channel. For example, the sidecar attached to the source microservice may make use of Mutual Transport Layer Security (mTLS) to establish an encrypted TLS connection in which both endpoints use digital certificates to authenticate each other. In one embodiment, if a bad certificate is received from an endpoint during the authentication process, the other endpoint may report a reputation event to a reputation management module (e.g., reputation management module 325).

At block 860, alternative communication paths may be evaluated. For example, communication channels involving an intermediate sidecar attached to a microservice that may have a security feature in common with both the source and destination microservice may be evaluated and established if an impact on QoS does not exceed a predetermined or configurable latency threshold. In one embodiment, metrics regarding the latency of the various communication channels may be monitored for this purpose.

At decision block 870, it is determined whether a satisfactory alternative path exists. If so, processing continues with block 880; otherwise, secure routing is complete.

At block 880, the message is sent via the identified alternative path. As above, prior to sending the message, the source microservice may establish an encrypted connection via the communication channel. For example, the sidecar attached to the source microservice may make use of mTLS to establish an encrypted TLS connection in which each pair endpoints involved in the communication channel use digital certificates to authenticate each other. In one embodiment, if a bad certificate is received from an endpoint during the authentication process, the other endpoint may report a reputation event to the reputation management module.

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Those skilled in the art will appreciate various additional enhancements/extensions may be performed. For example, peer endpoints may wrap communication with additional sideband information to permit correlated logging, where the log snippets can be analyzed and correlated with the help of sideband information to obtain end-to-end indications of what might be causing tail latencies to spike. Alternatively, or additionally, accesses to third party services may be sandwiched in point-to-point messages so that bulk data can be left in place at a source location but an authenticated token for it can be moved from sidecar S1 for microservice M1, to a sidecar S2 for microservice M2. Such bulk data may already be encrypted and for purposes of efficiency may be left in encrypted from until it reaches the destination endpoint (e.g., S2) rather than being decrypted and re-encrypted and then re-decrypted between M1 and M2.

Example Computer System

Figure 9:
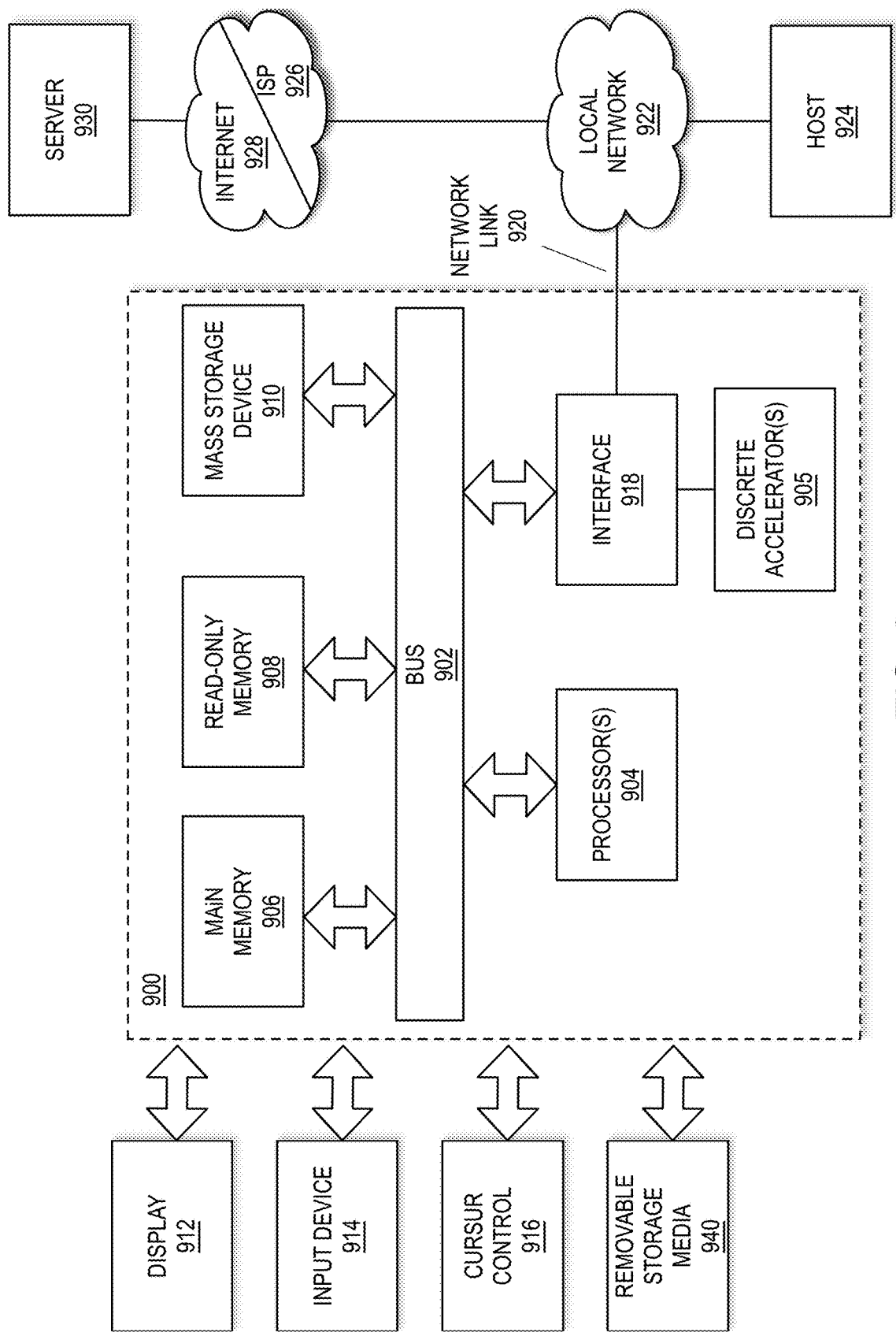
FIG. 9 is an example of a computer system in which one or more devices and/or with which one or more devices of a cluster may be associated according to some embodiments.

FIG. 9 is an example of a computer system 900 in which one or more devices and/or with which one or more devices of a cluster (e.g., cluster 100) may be associated according to some embodiments. Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., one or more hardware processors 904) coupled with bus 902 for processing information. The processing resource may be, for example, one or more general-purpose microprocessors or a system on a chip (SoC) integrated circuit, a non-limiting example of which is described below with reference to FIG. 10.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes interface circuitry 918 coupled to bus 902. The interface circuitry 918 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. As such, interface 918 may couple the processing resource in communication with one or more discrete accelerators 905 (e.g., one or more XPUs).

Interface 918 may also provide a two-way data communication coupling to a network link 920 that is connected to a local network 922. For example, interface 918 may be an integrated services digital network (ISDN) card, cable modem, satellite modem, or a modem to provide a data communication connection to a corresponding type of telephone line. As another example, interface 918 may be a local area network (LAN) card to provide a data communication connection to a compatible LAN. Wireless links may also be implemented. In any such implementation, interface 918 may send and receive electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

Example System on a Chip (SoC) Integrated Circuit

Figure 10:
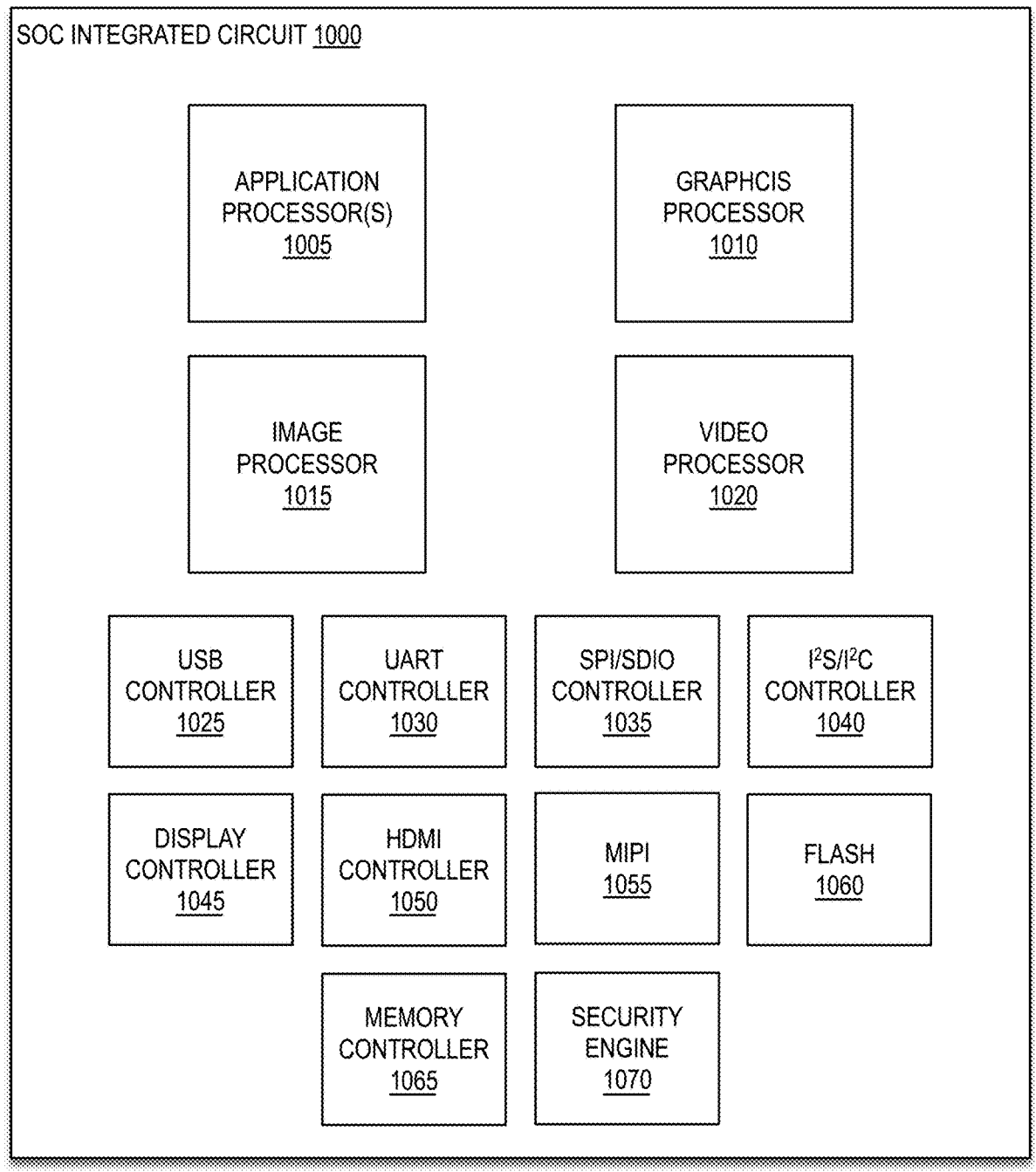
FIG. 10 is a block diagram illustrating an example system on a chip (SoC) integrated circuit in which one or more processors and XPUs may be implemented according to some embodiments.

FIG. 10 is a block diagram illustrating an example system on a chip (SoC) integrated circuit 1000 in which one or more processors and XPUs may be implemented according to some embodiments. In the context of the present example, integrated circuit 1000 includes one or more application processor(s) 1005 (e.g., CPUs) and one or more XPUs, for example, one or more of a graphics processor 1010, an image processor 1015, and a video processor 1020, any of which may be a modular IP core from the same or multiple different design facilities. Integrated circuit 1000 may also include peripheral or bus logic including a Universal Serial Bus (USB) controller 1025, a Universal Asynchronous Receiver-Transmitter (UART) controller 1030, an SPI/SDIO controller 1235, and an Inter-IC Sound Bus/Inter-IC communication (I²S/I²C) controller 1040. Additionally, the integrated circuit can include a display device controller 1045 coupled to one or more of a high-definition multimedia interface (HDMI) controller 1050 and a mobile industry processor interface (MIPI) display interface 1055. Storage may be provided by a flash memory subsystem 1060 including flash memory and a flash memory controller. Memory interface may be provided via a memory controller 1065 for access to SDRAM or SRAM memory devices. Some integrated circuits additionally include an embedded security engine 1070.

Many of the methods may be described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: discovering, by a first sidecar of a first microservice of a plurality of microservices of an application, a set of one or more security features of a first device of a plurality of devices of a set of one or more host systems on which the first microservice is running; making available to other of the plurality of microservices information regarding the set of one or more security features by sharing, by the first sidecar, the information with a discovery service accessible to the plurality of microservices; and determining, by a second sidecar of a second microservice of the plurality of microservices, a configuration of a communication channel through which a message is to be transmitted from the second microservice to the first microservice by issuing a request to the discovery service regarding the first microservice.

Example 2 includes the subject matter of Example 1, wherein said determining comprises dynamically increasing or reducing a strength of encryption for the communication channel based on a context of the communication channel.

Example 3 includes the subject matter of Examples 1-2, wherein the context of the communication channel comprises whether the communication channel is within a secure host of the plurality of devices or whether the communication channel is between two different hosts of the plurality of devices.

Example 4 includes the subject matter of Examples 1-3, wherein said discovering further comprises querying, by the first sidecar, the first device regarding existence of support for a particular security feature at one or more of a hardware level, a software level, and a firmware level as specified by a security feature discovery playbook.

Example 5 includes the subject matter of Examples 1-4, wherein the particular security feature comprises trusted platform module (TPM) technology, a public-key cryptography standard (PKCS), or hardware-based memory encryption operable to isolate application code and data in a memory of the first device.

Example 6 includes the subject matter of Examples 1-5, wherein said determining further comprises: responsive to determining a security of the communication channel can be improved by making use of an intermediate sidecar of a third microservice of the plurality of microservices; and causing, by the second sidecar, the intermediate sidecar to act as a mediator for communication of the message to the first microservice when an effect on quality of service of the communication does not exceed a threshold.

Example 7 includes the subject matter of Examples 1-6, further comprising: making, by the first sidecar, an observation potentially indicative of a particular microservice of the plurality of microservices being compromised; and responsive to the observation, causing, by the first sidecar, communications with the particular microservice to be blocked or deprioritized by informing other microservices of the plurality of microservices regarding the potential compromise via a gossip protocol.

Example 8 includes the subject matter of Examples 1-7, further comprising: identifying, by the first sidecar, an anomaly in relation to a number of calls received from a particular microservice of the plurality of microservices differing from a historical pattern of calls received from the particular microservice; and responsive to identification of the anomaly, causing, by the first sidecar, communications with the particular microservice to be blocked or deprioritized by informing other microservices of the plurality of microservices regarding the anomaly via a gossip protocol.

Some embodiments pertain to Example 9 that includes a non-transitory machine-readable medium storing instructions, which when executed by a host system including a plurality of devices including a processing resource and a hardware accelerator cause the host system to perform a method comprising: discovering, by a first sidecar of a first microservice of a plurality of microservices of an application, a set of one or more security features of a first device of the plurality of devices on which the first microservice is running; making available to other of the plurality of microservices information regarding the set of one or more security features by sharing, by the first sidecar, the information with a discovery service accessible to the plurality of microservices; and determining, by a second sidecar of a second microservice of the plurality of microservices, a configuration of a communication channel through which a message is to be transmitted from the second microservice to the first microservice by issuing a request to the discovery service regarding the first microservice.

Example 10 includes the subject matter of Example 9, wherein said determining comprises dynamically increasing or reducing a strength of encryption for the communication channel based on a context of the communication channel.

Example 11 includes the subject matter of Examples 9-10, wherein the context of the communication channel comprises whether the communication channel is within a secure host of the plurality of devices or whether the communication channel is between two different hosts of the plurality of devices.

Example 12 includes the subject matter of Examples 9-11, wherein said discovering further comprises querying, by the first sidecar, the first device regarding existence of support for a particular security feature at one or more of a hardware level, a software level, and a firmware level as specified by a security feature discovery playbook.

Example 13 includes the subject matter of Examples 9-12, wherein the particular security feature comprises trusted platform module (TPM) technology, a public-key cryptography standard (PKCS), or hardware-based memory encryption operable to isolate application code and data in a memory of the first device.

Example 14 includes the subject matter of Examples 9-13, wherein said determining further comprises: responsive to determining a security of the communication channel can be improved by making use of an intermediate sidecar of a third microservice of the plurality of microservices; and causing, by the second sidecar, the intermediate sidecar to act as a mediator for communication of the message to the first microservice when an effect on quality of service of the communication does not exceed a threshold.

Example 15 includes the subject matter of Examples 9-14, wherein the method further comprises: making, by the first sidecar, an observation potentially indicative of a particular microservice of the plurality of microservices being compromised; and responsive to the observation, causing, by the first sidecar, communications with the particular microservice to be blocked or deprioritized by informing other microservices of the plurality of microservices regarding the potential compromise via a gossip protocol.

Example 16 includes the subject matter of Examples 9-15, wherein the method further comprises: identifying, by the first sidecar, an anomaly in relation to a number of calls received from a particular microservice of the plurality of microservices differing from a historical pattern of calls received from the particular microservice; and responsive to identification of the anomaly, causing, by the first sidecar, communications with the particular microservice to be blocked or deprioritized by informing other microservices of the plurality of microservices regarding the anomaly via a gossip protocol.

Some embodiments pertain to Example 17 that includes a system comprising: a host system including a plurality of devices including a processing resource and a hardware accelerator; and a machine-readable medium, coupled to the host system, having stored therein instructions representing an application structured as a collection of microservices that when executed by the host system perform a method comprising: discovering, by a first sidecar of a first microservice of the collection of microservices, a set of one or more security features of a first device of the plurality of devices on which the first microservice is running; making available to other of the plurality of microservices information regarding the set of one or more security features by sharing, by the first sidecar, the information with a discovery service accessible to the plurality of microservices; and determining, by a second sidecar of a second microservice of the plurality of microservices, a configuration of a communication channel through which a message is to be transmitted from the second microservice to the first microservice by issuing a request to the discovery service regarding the first microservice.

Example 18 includes the subject matter of Example 17, wherein said determining comprises dynamically increasing or reducing a strength of encryption for the communication channel based on a context of the communication channel.

Example 19 includes the subject matter of Examples 17-18, wherein said discovering further comprises querying, by the first sidecar, the first device regarding existence of support for a particular security feature at one or more of a hardware level, a software level, and a firmware level as specified by a security feature discovery playbook.

Example 20 includes the subject matter of Examples 17-19, wherein the particular security feature comprises trusted platform module (TPM) technology, a public-key cryptography standard (PKCS), or hardware-based memory encryption operable to isolate application code and data in a memory of the first device.

Some embodiments pertain to Example 21 that includes a system comprising: a means for discovering, by a first sidecar of a first microservice of a plurality of microservices of an application, a set of one or more security features of a first device of a plurality of devices of a set of one or more host systems on which the first microservice is running; a means for making available to other of the plurality of microservices information regarding the set of one or more security features by sharing, by the first sidecar, the information with a discovery service accessible to the plurality of microservices; and a means for determining, by a second sidecar of a second microservice of the plurality of microservices, a configuration of a communication channel through which a message is to be transmitted from the second microservice to the first microservice by issuing a request to the discovery service regarding the first microservice.

Example 22 includes the subject matter of Example 21, wherein said means for determining is further operable to dynamically increase or reduce a strength of encryption for the communication channel based on a context of the communication channel.

Example 23 includes the subject matter of Examples 21-22, wherein the context of the communication channel comprises whether the communication channel is within a secure host of the plurality of devices or whether the communication channel is between two different hosts of the plurality of devices.

Example 24 includes the subject matter of Examples 21-23, wherein said means for discovering is further operable to query, by the first sidecar, the first device regarding existence of support for a particular security feature at one or more of a hardware level, a software level, and a firmware level as specified by a security feature discovery playbook.

Example 25 includes the subject matter of Examples 21-24, wherein the particular security feature comprises trusted platform module (TPM) technology, a public-key cryptography standard (PKCS), or hardware-based memory encryption operable to isolate application code and data in a memory of the first device.

Example 26 includes the subject matter of Examples 21-25, wherein said means for determining is further operable to: responsive to determining a security of the communication channel can be improved by making use of an intermediate sidecar of a third microservice of the plurality of microservices; and causing, by the second sidecar, the intermediate sidecar to act as a mediator for communication of the message to the first microservice when an effect on quality of service of the communication does not exceed a threshold.

Example 27 includes the subject matter of Examples 21-26, further comprising: a means for making, by the first sidecar, an observation potentially indicative of a particular microservice of the plurality of microservices being compromised; and a means responsive to the observation, for causing, by the first sidecar, communications with the particular microservice to be blocked or deprioritized by informing other microservices of the plurality of microservices regarding the potential compromise via a gossip protocol.

Example 28 includes the subject matter of Examples 21-27, further comprising: a means for identifying, by the first sidecar, an anomaly in relation to a number of calls received from a particular microservice of the plurality of microservices differing from a historical pattern of calls received from the particular microservice; and a means responsive to identification of the anomaly, for causing, by the first sidecar, communications with the particular microservice to be blocked or deprioritized by informing other microservices of the plurality of microservices regarding the anomaly via a gossip protocol.

Some embodiments pertain to Example 29 that includes an apparatus that implements or performs a method of any of Examples 1-9.

Example 30 includes at least one machine-readable medium comprising a plurality of instructions, when executed on a computing device, implement or perform a method or realize an apparatus as described in any preceding Example.

Example 31 includes an apparatus comprising means for performing a method as claimed in any of Examples 1-9.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   discovering, by a first sidecar of a first microservice of a plurality of microservices of an application, a set of one or more security features of a first device of a plurality of devices of a set of one or more host systems on which the first microservice is running;
   making available to other of the plurality of microservices information regarding the set of one or more security features by sharing, by the first sidecar, the information with a discovery service accessible to the plurality of microservices; and
   determining, by a second sidecar of a second microservice of the plurality of microservices, a configuration of a communication channel through which a message is to be transmitted from the second microservice to the first microservice by issuing a request to the discovery service regarding the first microservice.

2. The method of claim 1, wherein said determining comprises dynamically increasing or reducing a strength of encryption for the communication channel based on a context of the communication channel.

3. The method of claim 2, wherein the context of the communication channel comprises whether the communication channel is within a secure host of the plurality of devices or whether the communication channel is between two different hosts of the plurality of devices.

4. The method of claim 1, wherein said discovering further comprises querying, by the first sidecar, the first device regarding existence of support for a particular security feature at one or more of a hardware level, a software level, and a firmware level as specified by a security feature discovery playbook.

5. The method of claim 4, wherein the particular security feature comprises trusted platform module (TPM) technology, a public-key cryptography standard (PKCS), or hardware-based memory encryption operable to isolate application code and data in a memory of the first device.

6. The method of claim 1, wherein said determining further comprises:
   after determining a security of the communication channel can be improved by making use of an intermediate sidecar of a third microservice of the plurality of microservices; and
   causing, by the second sidecar, the intermediate sidecar to act as a mediator for communication of the message to the first microservice when an effect on quality of service of the communication does not exceed a threshold.

7. The method of claim 1, further comprising:
making, by the first sidecar, an observation indicative of a particular microservice of the plurality of microservices being compromised; and
after the observation, causing, by the first sidecar, communications with the particular microservice to be blocked or deprioritized by informing other microservices of the plurality of microservices regarding the potential compromise via a gossip protocol.

8. The method of claim 1, further comprising:
identifying, by the first sidecar, an anomaly in relation to a number of calls received from a particular microservice of the plurality of microservices differing from a historical pattern of calls received from the particular microservice; and
after identification of the anomaly, causing, by the first sidecar, communications with the particular microservice to be blocked or deprioritized by informing other microservices of the plurality of microservices regarding the anomaly via a gossip protocol.

9. A non-transitory machine-readable medium storing instructions, which when executed by a host system including a plurality of devices including a processing resource and a hardware accelerator cause the host system to perform a method comprising:
discovering, by a first sidecar of a first microservice of a plurality of microservices of an application, a set of one or more security features of a first device of the plurality of devices on which the first microservice is running;
making available to other of the plurality of microservices information regarding the set of one or more security features by sharing, by the first sidecar, the information with a discovery service accessible to the plurality of microservices; and
determining, by a second sidecar of a second microservice of the plurality of microservices, a configuration of a communication channel through which a message is to be transmitted from the second microservice to the first microservice by issuing a request to the discovery service regarding the first microservice.

10. The non-transitory machine-readable medium of claim 9, wherein said determining comprises dynamically increasing or reducing a strength of encryption for the communication channel based on a context of the communication channel.

11. The non-transitory machine-readable medium of claim 10, wherein the context of the communication channel comprises whether the communication channel is within a secure host of the plurality of devices or whether the communication channel is between two different hosts of the plurality of devices.

12. The non-transitory machine-readable medium of claim 9, wherein said discovering further comprises querying, by the first sidecar, the first device regarding existence of support for a particular security feature at one or more of a hardware level, a software level, and a firmware level as specified by a security feature discovery playbook.

13. The non-transitory machine-readable medium of claim 12, wherein the particular security feature comprises trusted platform module (TPM) technology, a public-key cryptography standard (PKCS), or hardware-based memory encryption operable to isolate application code and data in a memory of the first device.

14. The non-transitory machine-readable medium of claim 9, wherein said determining further comprises:
after determining a security of the communication channel can be improved by making use of an intermediate sidecar of a third microservice of the plurality of microservices; and
causing, by the second sidecar, the intermediate sidecar to act as a mediator for communication of the message to the first microservice when an effect on quality of service of the communication does not exceed a threshold.

15. The non-transitory machine-readable medium of claim 9, wherein the method further comprises:
making, by the first sidecar, an observation indicative of a particular microservice of the plurality of microservices being compromised; and
after the observation, causing, by the first sidecar, communications with the particular microservice to be blocked or deprioritized by informing other microservices of the plurality of microservices regarding the potential compromise via a gossip protocol.

16. The non-transitory machine-readable medium of claim 1, wherein the method further comprises:
identifying, by the first sidecar, an anomaly in relation to a number of calls received from a particular microservice of the plurality of microservices differing from a historical pattern of calls received from the particular microservice; and
after identification of the anomaly, causing, by the first sidecar, communications with the particular microservice to be blocked or deprioritized by informing other microservices of the plurality of microservices regarding the anomaly via a gossip protocol.

17. A system comprising:
a plurality of devices including a processing resource and a hardware accelerator; and
instructions representing an application structured as a collection of microservices that when executed by one or more of the plurality of devices perform a method comprising:
discovering, by a first sidecar of a first microservice of the collection of microservices, a set of one or more security features of a first device of the plurality of devices on which the first microservice is running;
making available to other of the plurality of microservices information regarding the set of one or more security features by sharing, by the first sidecar, the information with a discovery service accessible to the plurality of microservices; and
determining, by a second sidecar of a second microservice of the plurality of microservices, a configuration of a communication channel through which a message is to be transmitted from the second microservice to the first microservice by issuing a request to the discovery service regarding the first microservice.

18. The system of claim 17, wherein said determining comprises dynamically increasing or reducing a strength of encryption for the communication channel based on a context of the communication channel.

19. The system of claim 17, wherein said discovering further comprises querying, by the first sidecar, the first device regarding existence of support for a particular security feature at one or more of a hardware level, a software level, and a firmware level as specified by a security feature discovery playbook.

20. The system of claim 19, wherein the particular security feature comprises trusted platform module (TPM) technology, a public-key cryptography standard (PKCS), or hardware-based memory encryption operable to isolate application code and data in a memory of the first device.

\* \* \* \* \*